Sept. 16, 1958 J. F. VAUGHEN 2,852,193

CALCULATING DEVICE

Filed Aug. 15, 1956

*INVENTOR.*
JACK F. VAUGHEN by
Wright, Brown, Quinby & May
Att'ys

United States Patent Office 2,852,193

Patented Sept. 16, 1958

2,852,193

CALCULATING DEVICE

Jack F. Vaughen, Irving, Tex.

Application August 15, 1956, Serial No. 604,182

5 Claims. (Cl. 235—84)

Figures 1, 2, 3, 4, 5:
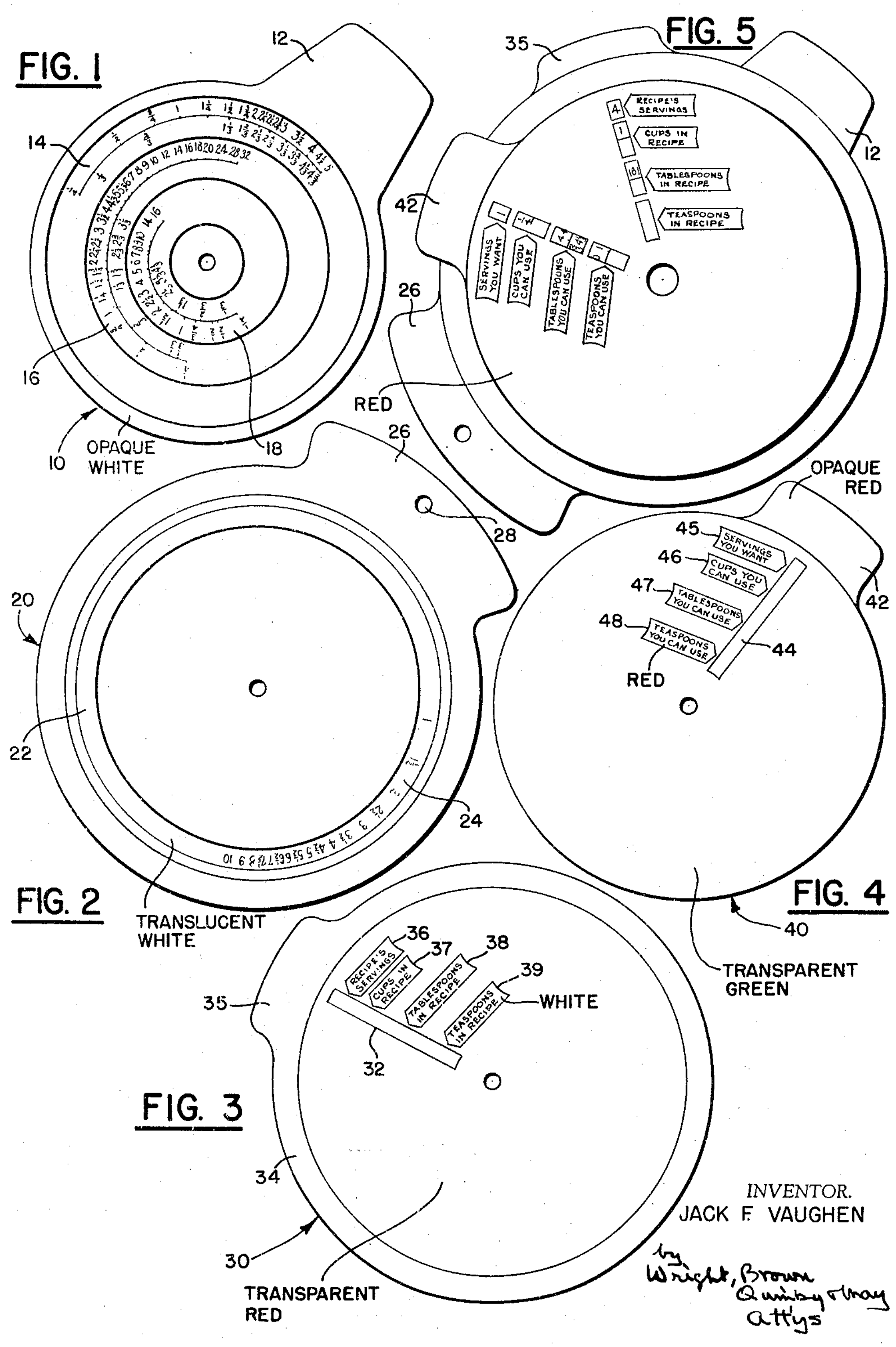

This invention relates to a device for indicating a number or value which is related to a selected number or value in the same way that a third number or value is related to a fourth. For example, the third and fourth numbers may have a certain ratio. The device can be used to indicate the number which has the same ratio to a selected number. The device comprises a series of concentric discs superposed on one another and relatively rotatable about their common center. Some of these discs have series of numbers or values printed thereon in arcuate array, the other discs being of colored transparent material so arranged as to conceal most of the numbers on the printed discs. When certain of the discs are rotatably adjusted to exhibit significant numbers as hereinafter described, one of the printed discs is then rotatably adjusted to bring the selected number into view. This results in the display of the desired number.

By way of illustration, the embodiment of the invention hereinafter described is an aid in adapting a cooking recipe for the preparation of a number of servings other than the number for which the given recipe is designed.

On the drawing,

Figures 1 to 4 are plan views of the four discs constituting parts of an illustrative embodiment of the invention; and Figure 5 is a plan view of the assembled device.

According to the invention use is made of discs of colored transparent material, the colors being such that the light rays passing through one of the discs are almost completely stopped by the other. In other words, the two discs when superposed are jointly substantially opaque. Certain shades of red and green may be thus employed as hereinafter described.

Figure 1 shows the lowermost disc 10 in the assembly illustrated in Figure 5. This disc is preferably of white non-transparent (i. e. opaque or translucent) material with a radially projecting finger tab 12 to facilitate manipulation. On this disc are printed three arcuate series 14, 16 and 18 of numbers, the arcs being of different radii. In this case the numbers are spaced logarithmically, that is, like the numbers on a circular slide rule. To avoid undue crowding where the numbers (especially mixed numbers) are close together, two concentric arcs are provided for each series, the numbers being staggered between two arcs.

On the disc 10 is superposed a disc 20 of colorless transparent material except for an annulus 22 of opaque or translucent white on which is printed a series 24 of numbers spaced logarithmically. This annulus and the series 24 printed thereon have a radius greater than the radii of the number series on the disc 10. This disc 20 has a finger tab 26 which may be distinguished by a special size or shape, also by a hole 28 by which the device can be hung on a hook when not in use.

Rotatable on the disc 20 is a disc 30 of red transparent material such as a suitably dyed synthetic resin. This disc has a radial slot 32 therein forming a window just wide enough to show one number in any of the arcuate series on discs 10 and 20. Disc 30 also has an opaque green margin 34 and finger tab 35. At one side of the window 32 are white labels 36, 37, 38 and 39 printed to identify the numbers that appear in the window 32.

On the disc 30 is the top disc 40 of transparent green material with an opaque red finger tab 42. This disc has a narrow radial window 44 through which a single number on each of the series on the discs 10 and 20 can appear. Beside the window 44 are red labels 45, 46, 47 and 48 printed to identify the numbers appearing in the window.

The four discs are held assembled concentrically by any suitable means such as a central rivet 50 so that they are all independently rotatable about their common center.

The device is operated as follows. When a recipe is selected which specifies a certain number of servings, the tab 26 is held while the tab 35 is manipulated to rotate the disc 30 until such number appears in the window 32, at the position labeled "Recipe's Servings." The tab 26 and green margin 34 are then held while the disc 40 is turned until the number representing the servings to be prepared appears in the window 44 at the position labeled "Servings you want." The disc 20, 30 and 40 are then held against relative rotation while the disc 10 is rotated to bring under the window 32 the quantity of an ingredient called for by the recipe. The corresponding required amount of such ingredient is then read through the window 44 in terms of the most appropriate units of measure. The disc 10 is rotated as may be necessary for each ingredient, the other three discs being held against any relative rotation between themselves.

The numbers appearing in the window 32 in the red disc show on a green background as they are seen through the green transparent disc 40. The numbers appearing through the window 44 in the green disc show on a red background as they are seen through the red disc 30. The portions of the discs 10 and 20 not directly under either window are invisible since the red disc 30 and green disc 40 are jointly substantially opaque.

Preferably the tab 35 which projects from the red disc 30 and the border 34 are colored green to match the labels 36—39 which are actually white but which appear green because they are seen through the green disc 40. The tab 35 and border 34 also match the background of the numbers appearing in the slot 32.

The labels 45—48 are preferably red and the tab 42 on the green disc 40 is preferably red to match the background of the numbers appearing through the slot 44. The arrangement of colors assists the operator in the manipulation of the device. The colors red and green are given by way of example. Any other two colors, such as orange and blue, may be employed if the colored discs are singly transparent but jointly substantially opaque.

I claim:

1. A calculating device comprising a circular disc of non-transparent sheet material having a plurality of series of numbers printed thereon, the numbers in said series being arranged in arcs concentric with said disc, a second disc concentrically superposed on the first said disc and rotatable relatively thereto, said second disc being of clear transparent material with a series of numbers printed thereon in arcuate array concentric with said discs, a third disc superposed on said second disc and rotatable relatively thereto, said third disc being of colored transparent material with a narrow radial slot therein arranged to span the circles defined by said arcuate series of numbers, and a fourth disc superposed on said third disc and rotatable relatively thereto, said fourth disc being of colored transparent material with a narrow radial slot therein arranged to span the circles defined by said arcuate series of numbers, the colors of the third and fourth discs being different and jointly substantially opaque.

2. A device as in claim 1, each said colored disc having thereon labels adjacent to its slot, the distance of each label from the disc axis being equal to the radial distance of one of said series of numbers.

3. A device as in claim 2, each said disc having a finger tab projecting radially therefrom to facilitate manipulation thereof.

4. A device as in claim 2, said colored transparent discs being respectively red and green.

5. A disc as in claim 3, the color of each colored disc being similar to the color of the finger tab of the other.

References Cited in the file of this patent

UNITED STATES PATENTS

| | | |
|---|---|---|
| 1,422,527 | Berger | July 11, 1922 |
| 1,629,680 | Cooke | May 24, 1927 |
| 1,801,225 | Craven | Apr. 14, 1931 |
| 1,929,668 | Goldsborough | Oct. 10, 1933 |
| 2,418,436 | Talbot | Apr. 1, 1947 |
| 2,546,510 | Jones | Mar. 27, 1951 |